US012165805B2

(12) United States Patent
Gehy

(10) Patent No.: US 12,165,805 B2
(45) Date of Patent: Dec. 10, 2024

(54) TOOL HOLDING DEVICE

(71) Applicant: James Gehy, Wesley Chapel, FL (US)

(72) Inventor: James Gehy, Wesley Chapel, FL (US)

( * ) Notice: Subject to any disclaimer, the term of this patent is extended or adjusted under 35 U.S.C. 154(b) by 370 days.

(21) Appl. No.: 17/697,137

(22) Filed: Mar. 17, 2022

(65) Prior Publication Data

US 2023/0298792 A1 Sep. 21, 2023

(51) Int. Cl.

| | |
|---|---|
| ***B25H 3/06*** | (2006.01) |
| ***A45F 5/02*** | (2006.01) |
| ***H01F 7/02*** | (2006.01) |
| *A45F 5/00* | (2006.01) |

(52) U.S. Cl.

CPC ............ *H01F 7/0252* (2013.01); *A45F 5/021* (2013.01); *B25H 3/06* (2013.01); *A45F 2005/006* (2013.01)

(58) Field of Classification Search

CPC ........... H01F 7/0252–0268; B25H 3/06; A45F 5/021; A45F 2005/006

See application file for complete search history.

(56) References Cited

U.S. PATENT DOCUMENTS

| | | | | |
|---|---|---|---|---|
| 4,826,059 A * | 5/1989 | Bosch | .................... | A45C 11/24 211/DIG. 1 |
| D374,984 S | 10/1996 | Scott | | |
| 5,760,668 A * | 6/1998 | Testa | .................... | B23Q 3/1546 211/DIG. 1 |
| D493,957 S | 8/2004 | Balliet | | |
| 8,403,140 B2 | 3/2013 | Woolery | | |
| 2005/0082323 A1 | 4/2005 | O'Hair | | |
| 2006/0016841 A1 | 1/2006 | Shurm | | |
| 2006/0196900 A1 | 9/2006 | Sasick | | |
| 2013/0299544 A1 * | 11/2013 | Moreau | ..................... | A45F 5/02 224/675 |

FOREIGN PATENT DOCUMENTS

WO WO2006019777 2/2006

* cited by examiner

*Primary Examiner* — Ramon M Barrera

(57) ABSTRACT

A tool holding device for holding and organizing drill attachments includes a panel, which has opposed faces. A set of magnets is embedded in the panel. Respective magnets magnetically engage a ferromagnetic tool, such as a drill attachment, which is brought into proximity with a respective opposed face of the panel. The ferromagnetic tool thus is removably engaged to the panel. A fastener is engaged to the panel and is selectively engageable to an article worn by the user, such as a beltloop, belt, backpack, or the like. The fastener thus removably engages the panel to the article.

11 Claims, 3 Drawing Sheets

(In-Use View)

(Front View)

(ISO Top View)

(Top View)

(Cross sectional View)

(In-Use View)

TOOL HOLDING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tool holders and more particularly pertains to a new tool holder for holding and organizing drill attachments. The present invention discloses a tool holder comprising a plate with imbedded magnets and a carabiner tethered to one corner, wherein the plate is configured to engage a plurality of ferromagnetic tools, such as drill attachments.

(2) Description of Related Art Including Information Disclosed Under 37 CFR 1.97 and 1.98

The prior art relates to tool holders. Prior art tool holders may comprise armbands, neckbands, and aprons, having incorporated magnets for holding tools. What is lacking in the prior art is a tool holder comprising a plate with imbedded magnets and a carabiner tethered to one corner.

BRIEF SUMMARY OF THE INVENTION

An embodiment of the disclosure meets the needs presented above by generally comprising a panel, which has opposed faces. A set of magnets is embedded in the panel. Respective magnets are configured to magnetically engage a ferromagnetic tool, such as a drill attachment, which is brought into proximity with a respective opposed face of the panel. The ferromagnetic tool thus is removably engaged to the panel. A fastener is engaged to the panel and is configured to selectively engage an article worn by the user, such as a beltloop, belt, backpack, or the like. The fastener thus is configured to removably engage the panel to the article.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
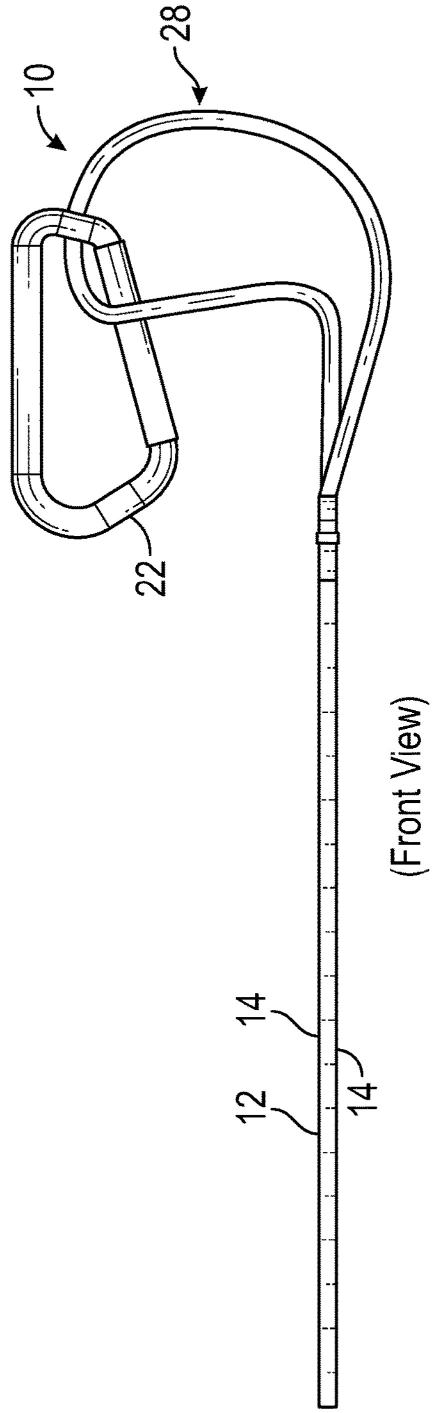
FIG. 1 is a side view of a tool holding device according to an embodiment of the disclosure.
Figure 2:
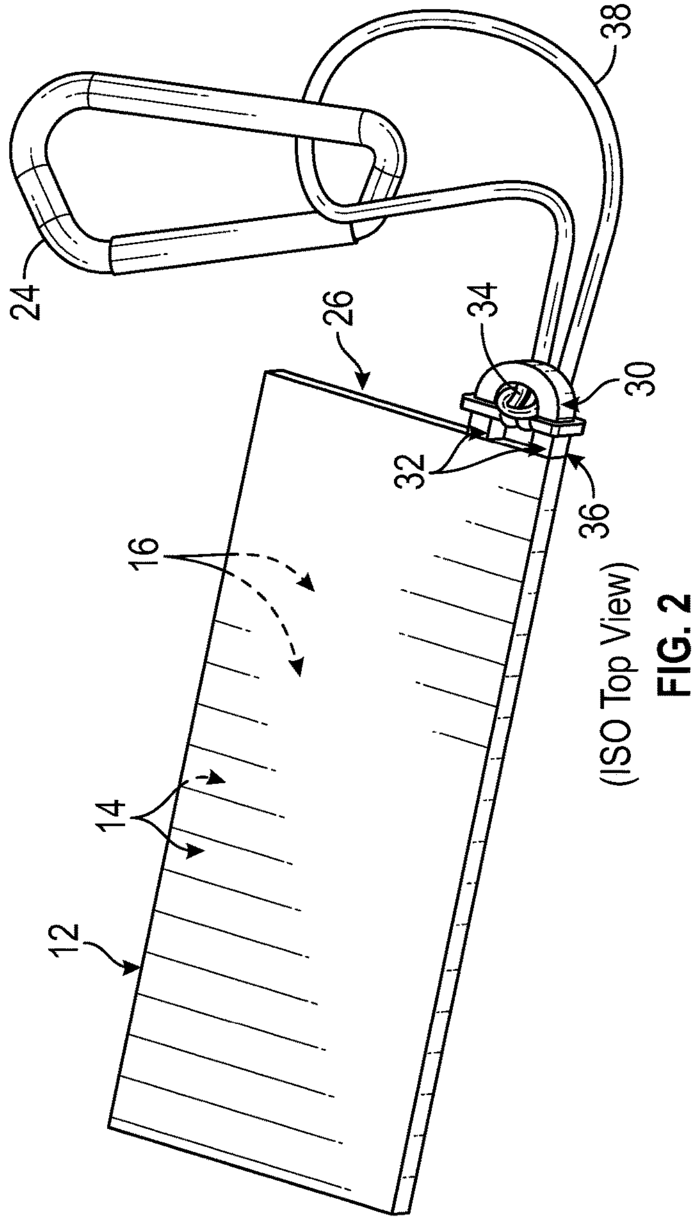
FIG. 2 is an isometric perspective view of an embodiment of the disclosure.

With reference now to the drawings, and in particular to FIGS. 1 through 5 thereof, a new tool holder embodying the principles and concepts of an embodiment of the disclosure and generally designated by the reference numeral 10 will be described.

Figure 3:
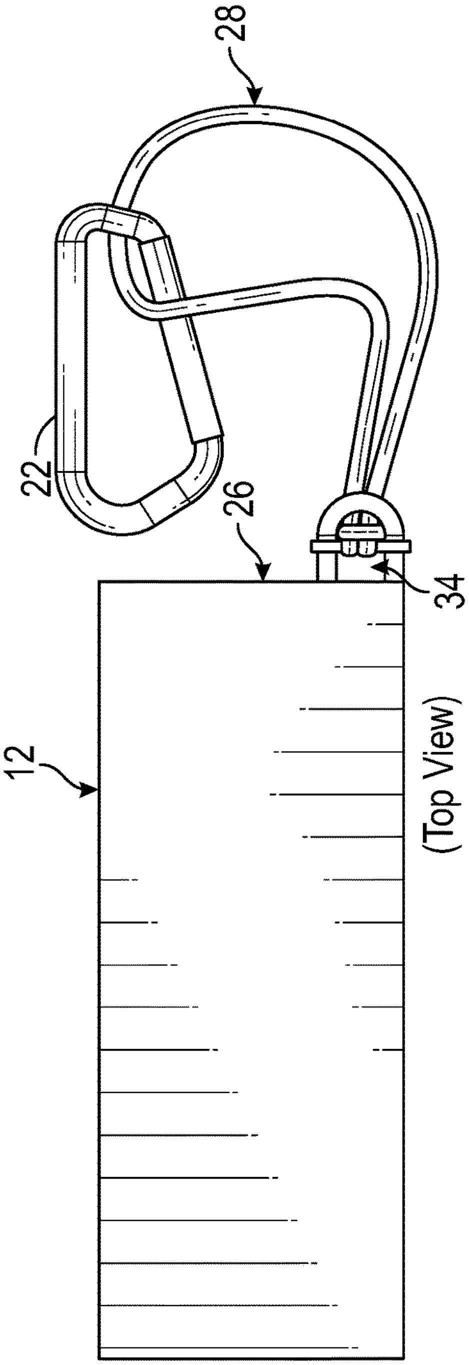
FIG. 3 is a top view of an embodiment of the disclosure.

As best illustrated in FIGS. 1 through 5, the tool holding device 10 generally comprises a panel 12, which has opposed faces 14. The panel 12 is substantially rigid. The panel 12 may be substantially planar, as shown in FIG. 1, although the present invention also anticipates the panel 12 being nonplanar. For example, a plurality of recesses (not shown) may be positioned in the opposed faces 14 of the panel 12. The opposed faces 14 may be substantially rectangular, as shown in FIG. 3, or alternatively shaped, such as, but not limited to, oval, trapezoidal, and the like. The panel 12 comprises plastic, aluminum, wood, bamboo, or the like.

Figure 4:
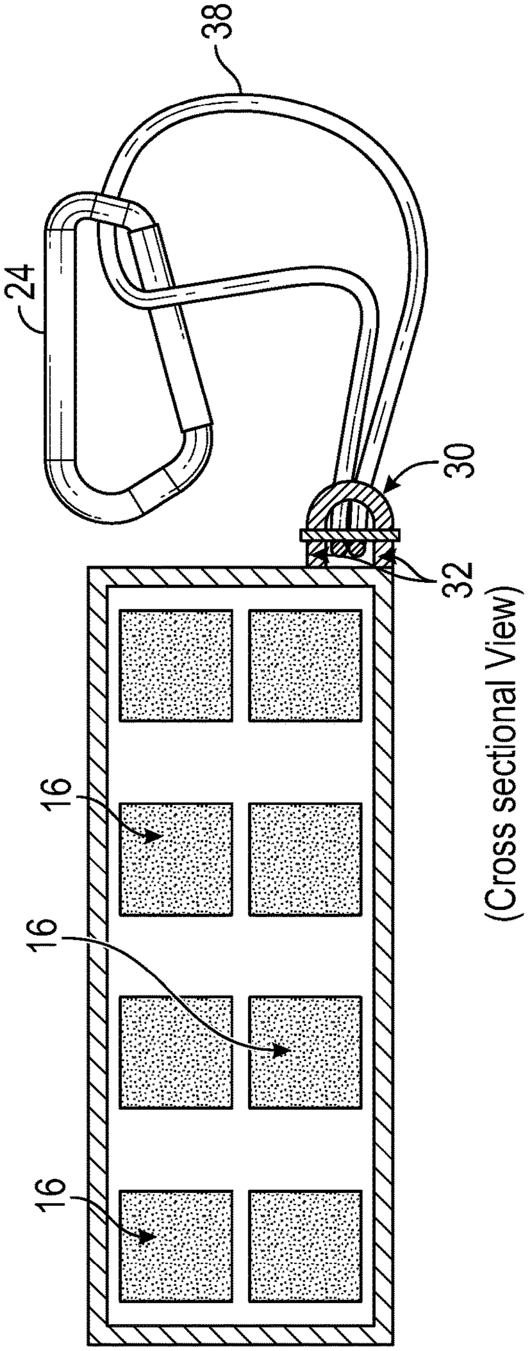
FIG. 4 is a cross-sectional view of an embodiment of the disclosure.
Figure 5:
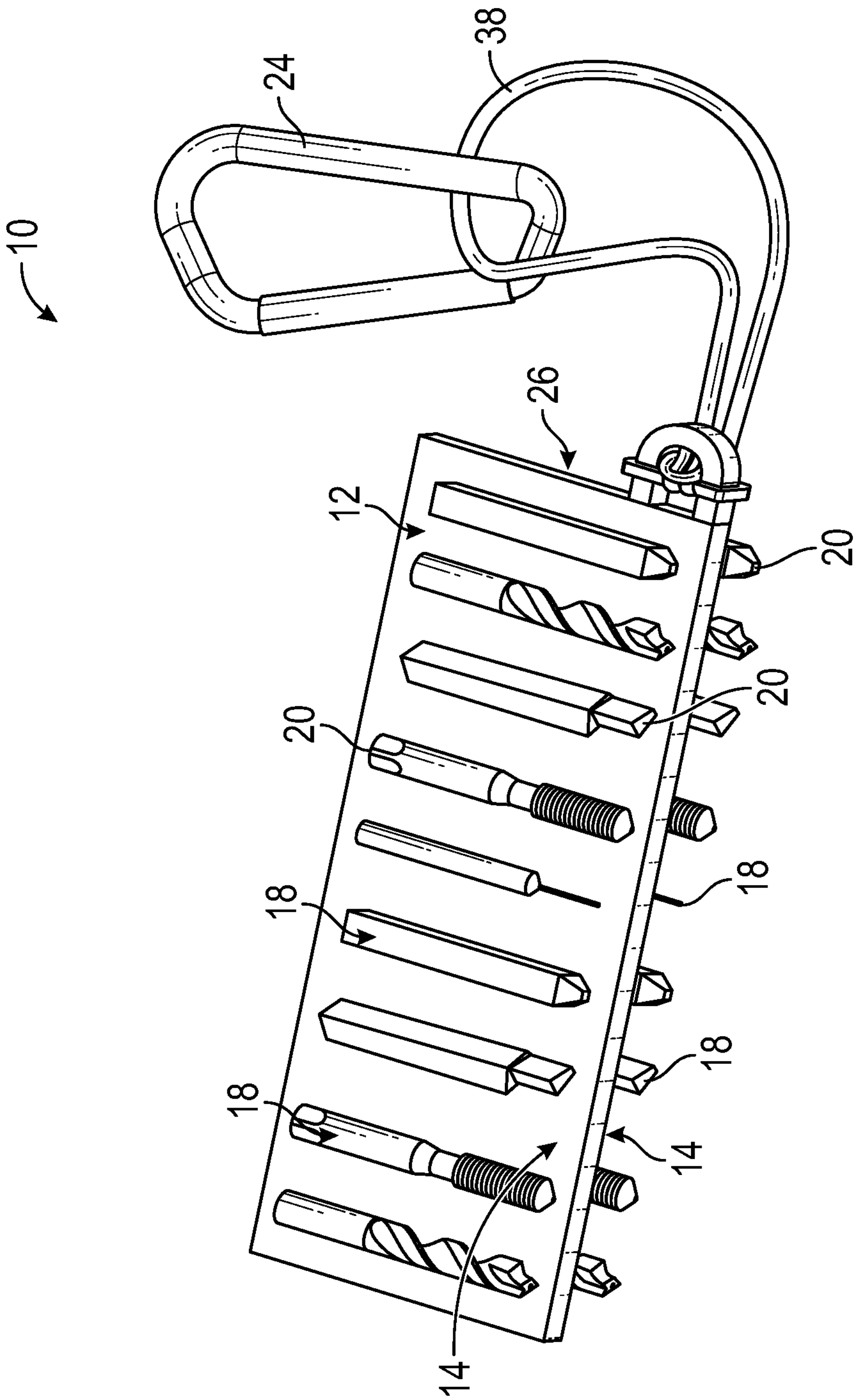
FIG. 5 is an in-use view of an embodiment of the disclosure.

A set of magnets 16 is embedded in the panel 12. The set of magnets 16 comprises from one to twenty magnets 16. The set of magnets 16 may comprise from four to twelve magnets 16. The set of magnets 16 may comprise eight magnets 16, as shown in FIG. 4. The magnets 16 comprise one or more of neodymium, iron, boron, aluminum, strontium, barium, manganese, nickel, zinc, and cobalt. Respective magnets 16 are configured to magnetically engage a ferromagnetic tool 18, such as a drill attachment 20, which is brought into proximity with a respective opposed face 14 of the panel 12. The ferromagnetic tool 18 thus is removably engaged to the panel 12, as shown in FIG. 5.

A fastener 22 is engaged to the panel 12 and is configured to selectively engage an article worn by the user, such as a beltloop, belt, backpack, or the like. The fastener 22 thus is configured to removably engage the panel 12 to the article. The fastener 22 comprises a carabiner 24, as shown in FIGS. 1-5, a clip (not shown), or the like, which is engaged to a respective opposed end 26 of the panel 12.

The tool holding device 10 also may comprise a tether 28, which is engaged to and which extends between the panel 12 and the fastener 22. The tool holding device 10 also may comprise a rod 30, which has opposed termini 32 that are engaged to the respective opposed end 26 of the panel 12 to define a loop 34. The rod 30 extends substantially coplanarly from the panel 12 proximate to a respective corner 36 of the panel 12, as shown in FIG. 3. The tether 28 may comprise a circular rope 38, which extends through the loop 34 and the carabiner 24 so that the carabiner 24 and the rod 30 are engaged to the circular rope 38.

In use, a plurality of ferromagnetic tools 18, such as a plurality of drill attachments 20, is engaged to the panel 12 by the magnets 16. The carabiner 24 then is fastened to a beltloop of pants worn by the user. The panel 12 and the ferromagnetic tools 18 can be stowed in a pocket of the pants when not in routine use. When the ferromagnetic tools 18 are needed, the panel 12 and the ferromagnetic tools 18 are pulled from the pocket and allowed to hang by the circular rope 38 from the carabiner 24 and the beltloop, where the ferromagnetic tools 18 are readily accessible to the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A tool holding device comprising:

a panel having opposed faces;

a set of magnets embedded in the panel, wherein respective magnets are configured for magnetically engaging a ferromagnetic tool brought into proximity with a respective opposed face of the panel, such that the ferromagnetic tool is removably engaged to the panel;

a fastener engaged to the panel, the fastener being configured for selectively engaging an article worn by the user, wherein the fastener is configured for removably engaging the panel to the article;

wherein the fastener comprises a carabiner or a clip engaged to a respective opposed end of the panel, wherein the fastener is configured for engaging the panel to a beltloop, belt, or pack worn by the user;

a tether engaged to and extending between the panel and the fastener;

a rod having opposed termini engaged to the respective opposed end of the panel defining a loop; and the tether comprising a circular rope extending through the loop and the carabiner, such that the carabiner and the rod are engaged to the circular rope.

2. The tool holding device of claim 1, wherein the panel is substantially rigid and planar.

3. The tool holding device of claim 1, wherein the opposed faces are substantially rectangular.

4. The tool holding device of claim 1, wherein the panel comprises plastic.

5. The tool holding device of claim 1, wherein the set of magnets comprises from one to twenty magnets.

6. The tool holding device of claim 5, wherein the set of magnets comprises from four to twelve magnets.

7. The tool holding device of claim 6, wherein the set of magnets comprises eight magnets.

8. The tool holding device of claim 1, wherein the magnets comprise one or more of neodymium, iron, boron, aluminum, strontium, barium, manganese, nickel, zinc, and cobalt.

9. The tool holding device of claim 1, further including a tether engaged to and extending between the panel and the fastener.

10. The tool holding device of claim 1, wherein:

the opposed faces are substantially rectangular; and the rod extends substantially coplanarly from the panel proximate to a respective corner of the panel.

11. A tool holding device comprising:

a panel having opposed faces, the panel being substantially rigid and planar, the opposed faces being substantially rectangular, the panel comprising plastic;

a set of magnets embedded in the panel, wherein respective magnets are configured for magnetically engaging a ferromagnetic tool brought into proximity with a respective opposed face of the panel, such that the ferromagnetic tool is removably engaged to the panel, the set of magnets comprising from one to twenty magnets, the set of magnets comprising from four to twelve magnets, the set of magnets comprising eight magnets, the magnets comprising one or more of neodymium, iron, boron, aluminum, strontium, barium, manganese, nickel, zinc, and cobalt;

a fastener engaged to the panel, the fastener being configured for selectively engaging an article worn by the user, wherein the fastener is configured for removably engaging the panel to the article, the fastener comprising a carabiner or a clip engaged to a respective opposed end of the panel, wherein the fastener is configured for engaging the panel to a beltloop, belt, or pack worn by the user;

a tether engaged to and extending between the panel and the fastener; and a rod having opposed termini engaged to the respective opposed end of the panel defining a loop, the tether comprising a circular rope extending through the loop and the carabiner, such that the carabiner and the rod are engaged to the circular rope, the rod extending substantially coplanarly from the panel proximate to a respective corner of the panel.

* * * * *